United States Patent [19]
Gray

[11] Patent Number: 5,498,104
[45] Date of Patent: Mar. 12, 1996

[54] LEACHING CHAMBER

[76] Inventor: Terrance H. Gray, 28 Webber Ave., Bath, Me. 04530

[21] Appl. No.: 320,496

[22] Filed: Oct. 7, 1994

Related U.S. Application Data

[63] Continuation-in-part of Ser. No. 236,449, Apr. 29, 1994, Pat. No. 5,441,363.

[51] Int. Cl.$^6$ .................................................. E02B 13/00
[52] U.S. Cl. ................................ 405/43; 405/45; 405/46; 405/49; 403/335; 403/364
[58] Field of Search ...................... 405/43, 45, 46, 405/49, 36, 124, 125; 403/335, 364; 138/109; 285/138

[56] References Cited

U.S. PATENT DOCUMENTS

| | | | |
|---|---|---|---|
| D. 207,293 | 3/1967 | Ferm | D91/1 |
| D. 329,684 | 9/1992 | Gray | D23/207 |
| 460,352 | 9/1891 | Reading . | |
| 680,548 | 8/1901 | Sikes . | |
| 980,442 | 1/1911 | Schafly . | |
| 1,255,023 | 1/1918 | Lang . | |
| 1,497,549 | 6/1924 | Conradi . | |
| 1,541,918 | 6/1925 | Brennan . | |
| 1,873,495 | 8/1932 | Smittle . | |
| 2,153,789 | 4/1939 | Carswell et al. | 61/13 |
| 2,366,522 | 1/1945 | Gutman | 61/10 |
| 2,788,993 | 4/1957 | Oldham . | |
| 2,834,087 | 5/1958 | Herman | 24/279 |
| 2,866,319 | 12/1958 | Nicholson | 61/11 |
| 3,042,430 | 7/1962 | Guy | 285/365 |
| 3,151,631 | 10/1964 | Yano | 138/97 |
| 3,333,422 | 8/1967 | Neyland | 61/13 |
| 3,339,366 | 9/1967 | Gogan et al. | 61/13 |
| 3,341,178 | 9/1967 | Cott | 254/79 |
| 3,440,823 | 4/1969 | Olsen | 61/11 |
| 3,495,410 | 2/1970 | Bailey et al. | 61/11 |
| 3,570,251 | 3/1971 | Roberts . | |
| 3,579,995 | 5/1971 | Flynn | 61/13 |
| 3,645,100 | 2/1972 | La Monica | 61/13 |
| 3,820,341 | 6/1974 | Richard et al. | 61/13 |
| 3,898,162 | 8/1975 | Carlson et al. | 210/170 |
| 3,910,051 | 10/1975 | Komisarek | 61/11 |
| 3,962,088 | 6/1976 | Kuhlenschmidt et al. | 210/170 |
| 4,162,976 | 7/1979 | Monson | 210/170 |
| 4,166,720 | 9/1979 | Weber | 23/230 |
| 4,183,696 | 1/1980 | Auriemma | 405/43 |
| 4,192,628 | 3/1980 | Gorman | 405/45 |
| 4,239,416 | 12/1980 | Borca et al. | 405/53 |
| 4,245,924 | 1/1981 | Fouss et al. | 405/45 |
| 4,360,042 | 11/1982 | Fouss et al. | 138/119 |
| 4,363,563 | 12/1982 | Hallenius et al. | 405/55 |
| 4,379,654 | 4/1983 | Rovelli | 405/53 |
| 4,416,340 | 11/1983 | Bailey | 175/195 |
| 4,523,613 | 6/1985 | Fouss et al. | 138/121 |
| 4,588,325 | 5/1986 | Seefert | 405/46 |
| 4,598,277 | 7/1986 | Feldman | 340/604 |
| 4,624,603 | 11/1986 | Kanao | 405/49 |

(List continued on next page.)

OTHER PUBLICATIONS

May, "Technical Support Paper for *The Infiltrator* Leaching System" (Apr. 1987).

Infiltrator Systems, Inc., "The No Gravel Leaching Field System You can Haul In One Truck, *The Infiltrator*" (Marketing Brochure).

*Primary Examiner*—Ramon S. Britts
*Assistant Examiner*—Frederick L. Lagman
*Attorney, Agent, or Firm*—Hamilton, Brook, Smith & Reynolds

[57] ABSTRACT

A leaching chamber for burial in the ground includes nonsymmetrical corrugations extending laterally across the leaching chamber. Each corrugation has a ridge and a shoulder with the ridge being higher than the shoulder and sloping down from the ridge to the shoulder. Additionally, the ridge of each corrugation is also wider than the shoulder. The corrugations are oriented relative to each other such that the ridge of each corrugation is adjacent to the shoulder of an adjoining corrugation. Identical chambers are joined by mating flanges, each flange including a series of flange members alternating about a common reference curve, which defines a matable surface of each flange member.

54 Claims, 16 Drawing Sheets

U.S. PATENT DOCUMENTS

| | | | |
|---|---|---|---|
| 4,759,661 | 7/1988 | Nichols | 405/48 |
| 4,790,567 | 12/1988 | Kawano | 285/24 |
| 4,797,030 | 1/1989 | Lockwood | 405/125 |
| 5,087,151 | 2/1992 | DiTullio | 405/43 |
| 5,110,459 | 5/1992 | Baxter | 210/143 |
| 5,149,143 | 9/1992 | Howell | 285/18 |
| 5,156,488 | 10/1992 | Nichols | 405/48 |
| 5,234,286 | 8/1993 | Wagner | 405/53 |

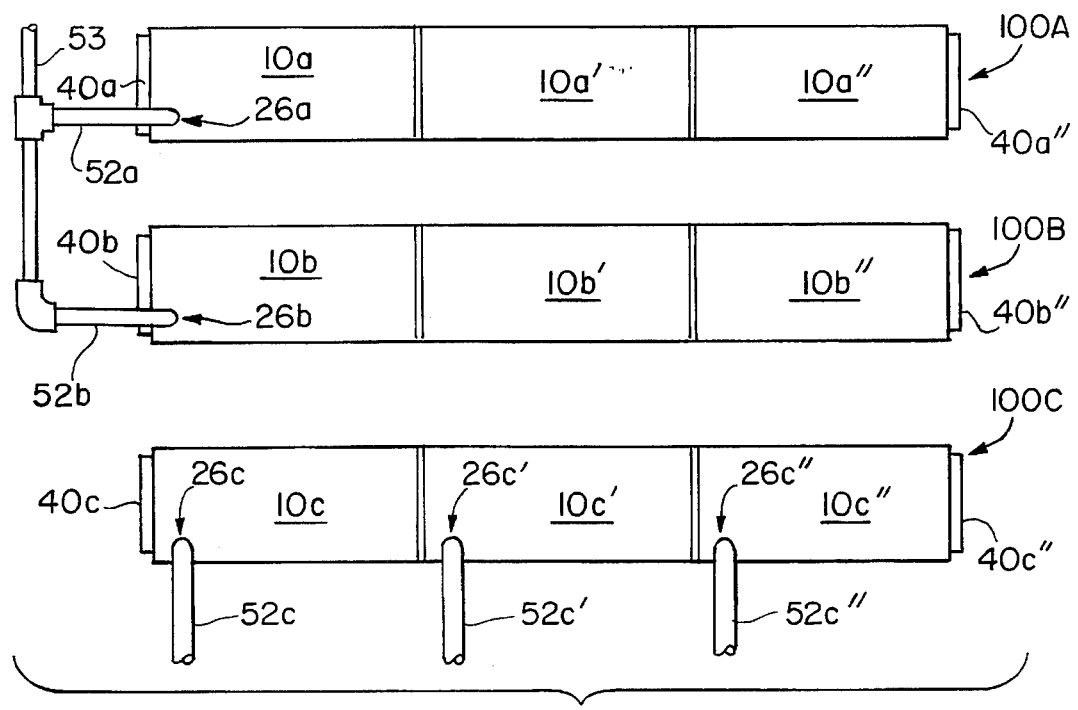
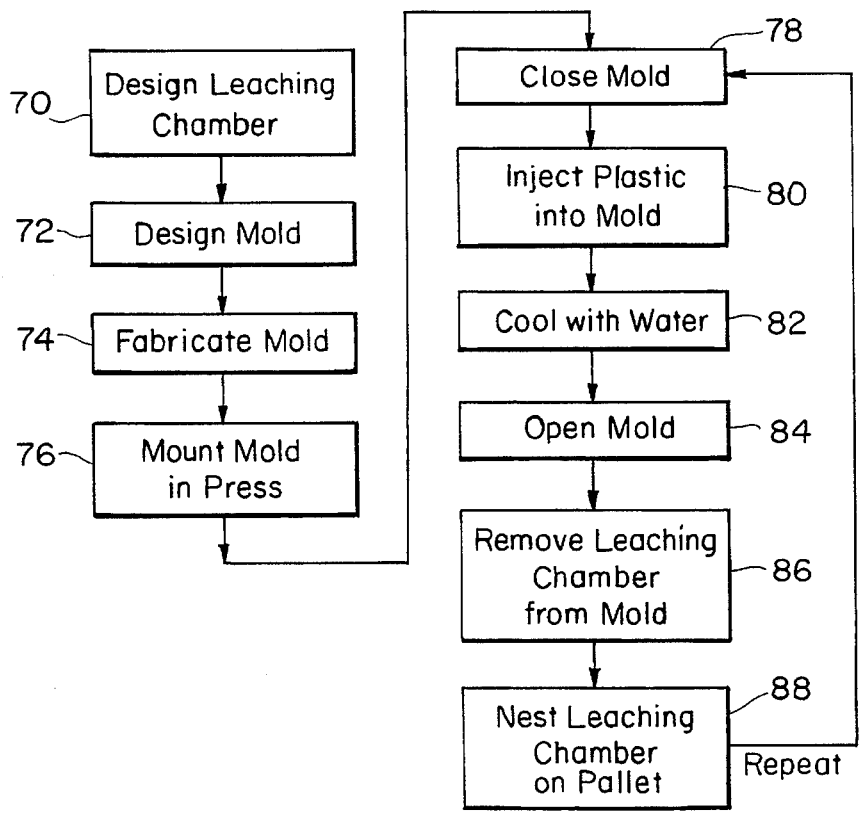
FIG. 11
FIG. 12

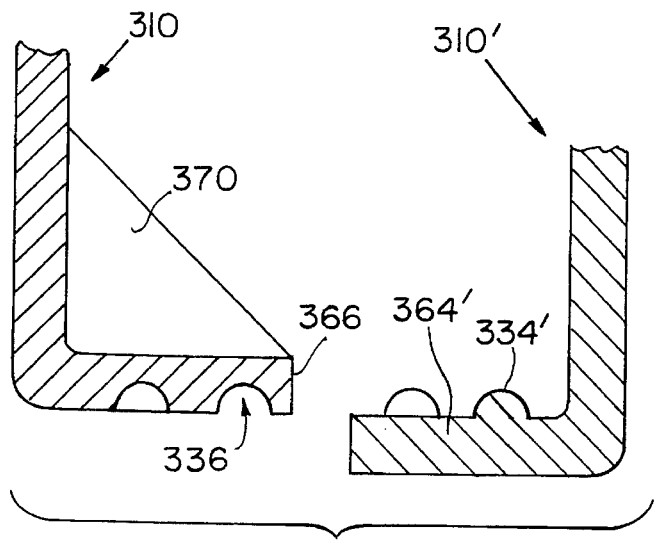
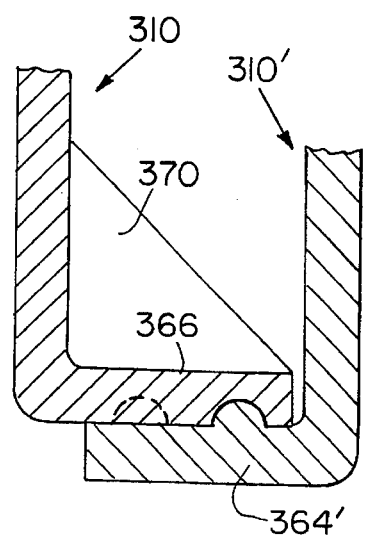
FIG. 17A
FIG. 17B
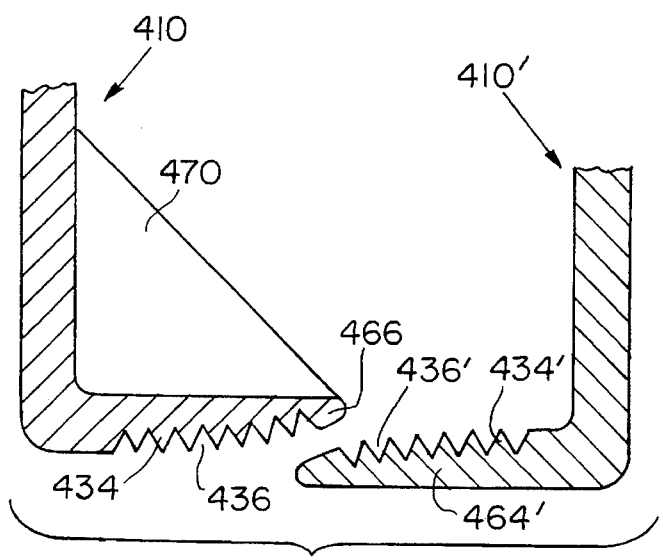
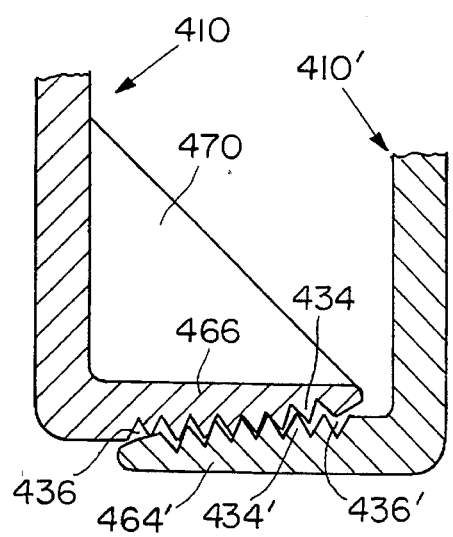
FIG. 18A
FIG. 18B

LEACHING CHAMBER

RELATED APPLICATIONS

This application is a Continuation-In-Part of U.S. patent application Ser. No. 08/236,499 by Terrance H. Gray entitled "Leaching Chamber" and filed Apr. 29, 1994, now U.S. Pat. No. 5,441,363, the contents of which are incorporated herein by reference in its entirety.

BACKGROUND

Hollow plastic leaching chambers are commonly buried in the ground to form leaching fields for receiving and dispersing liquids such as sewage system effluent or storm water into the surrounding earth. Such leaching chambers have a central cavity for receiving liquids. An opening on the bottom and slots on the sides provide the means through which liquids are allowed to exit the central cavity and disperse into the surrounding earth. Typically, multiple leaching chambers are connected to each other in series to achieve a desired subterranean volume and dispersion area. Leaching chambers are usually arch-shaped and corrugated with symmetrical corrugations for strength. Additionally, leaching chambers usually come in standard sizes. The most common size for most leaching chambers is roughly six feet long, three feet wide and slightly over one foot high.

The amount of liquid that a given leaching chamber is capable of receiving and dispersing is dependent upon the internal volume of the leaching chamber and the dispersion area over which the leaching chamber can disperse the liquids. Because most plastic leaching chambers are arch-shaped for strength, the volume and dispersion area for any given leaching chamber having the same dimensions is roughly the same. Therefore, most present leaching chambers of the same size have roughly the same capacity.

The capacity of a leaching field depends upon the size and the number of leaching chambers employed. If the size or the number of the leaching chambers employed in a leaching field is increased, the volume and dispersion area is increased, thereby increasing capacity of the leaching field. However, increasing the size or the number of leaching chambers also increases the cost as well as the area of land required for burying the leaching chambers.

SUMMARY OF THE INVENTION

The present invention provides a standard-sized leaching chamber which is capable of receiving and dispersing 10% more liquids than existing leaching chambers of the same size. Such a leaching chamber allows fewer leaching chambers to be employed for a given application and, therefore, reduces costs.

The present invention resides in a leaching chamber for burial in the ground including a hollow load bearing structure or conduit having a longitudinal axis. The conduit comprises a plurality of corrugations extending in directions transverse to the longitudinal axis. Each corrugation is non-symmetrical about the longitudinal axis.

In preferred embodiments, each corrugation has a ridge, a central sloping section and a shoulder. The ridge is higher than the shoulder and the central section slopes down from the ridge to the shoulder. On the ridge side of the central axis of the chamber, the central section is convex when viewed from above. On the shoulder side, the central section becomes concave when viewed from above. The cross-section of each corrugation in the direction transverse to the longitudinal axis is non-symmetrical. Each ridge is also wider than the shoulder in the longitudinal direction such that the corrugations are also non-symmetrical when viewed from above. The corrugations are oriented relative to each other such that the ridge of each corrugation is adjacent to the shoulder of an adjoining corrugation. The orientation of the corrugations provides the conduit with a roof having lateral edges in which portions of the edges of the roof are higher than central portions of the roof. Additionally, the adjoining corrugations are laterally offset from each other relative to the longitudinal axis. Passages within the conduit enable liquids to leach from the conduit and vents in the corrugations allow air to escape from the conduit.

The conduit includes a pipe access port. The pipe access port is configured such that a discharge pipe may be coupled to the access port either from a direction parallel to the longitudinal axis or a direction transverse to the longitudinal axis of the conduit.

The conduit also includes a locking flange at a longitudinal end of the conduit for locking the conduit to another conduit. The locking flange includes a series of flange members which are offset from each other such that the flange members alternate about a common reference curve (or line) which defines a matable surface boundary of each flange member.

Another aspect of the present invention resides in an end cap for enclosing the end of the conduit. The end cap has a locking flange which includes a series of flange members. The flange members are offset from each other and are capable of mating and locking with the flange members of an identical mating conduit.

The present invention leaching chamber is roughly the same size as current leaching chambers but has a 10% larger volume which allows the present invention to receive and disperse 10% more liquids than obtainable with existing leaching chambers.

The conduit is fabricated to facilitate nesting of conduits in a stack of conduits for ease of transport. A base flange extending from each conduit has slots formed therein for facilitating the lifting of the conduit with tools. More specifically, knotted ropes attached to a crane are inserted into the slots so that one or more conduits can be easily lifted from a stack of conduits.

Alternate embodiments of the invention include arch-shaped corrugated conduits having a flange with a series of flange members alternating about a common reference curve which defines a matable surface boundary of each flange member. In particular, the arch-shaped conduit has alternating peak corrugations and valley corrugations along the length. The conduit can also include a sub-arch at the top of the arch-shape at the ends of the conduit.

BRIEF DESCRIPTION OF THE DRAWINGS

The foregoing and other objects, features and advantages of the invention, including various novel details of construction and construction of parts, will be apparent from the following more particular drawings and description of preferred embodiments of the leaching chamber in which like reference characters refer to the same parts throughout the different views. The drawings are not necessarily to scale, emphasis instead being placed upon illustrating the principles of the invention. It will be understood that the particular leaching chambers embodying the invention are shown by way of illustration only and not as a limitation of the invention. The principles and features of this invention may be employed and varied in numerous embodiments without departing from the scope of the invention.

FIG. 11 is a top view of an array of leaching chambers coupled to a series of discharge pipes.

FIG. 12 is a flow chart of the manufacturing process of a preferred embodiment of a leaching chamber.

FIGS. 17A and 17B are cross sectional schematic diagrams of mating flange members of FIG. 16.

FIGS. 18A and 18B are cross sectional schematic diagrams of mating flange members with a saw tooth coupling.

DETAILED DESCRIPTION OF THE PREFERRED EMBODIMENTS

Figure 1:
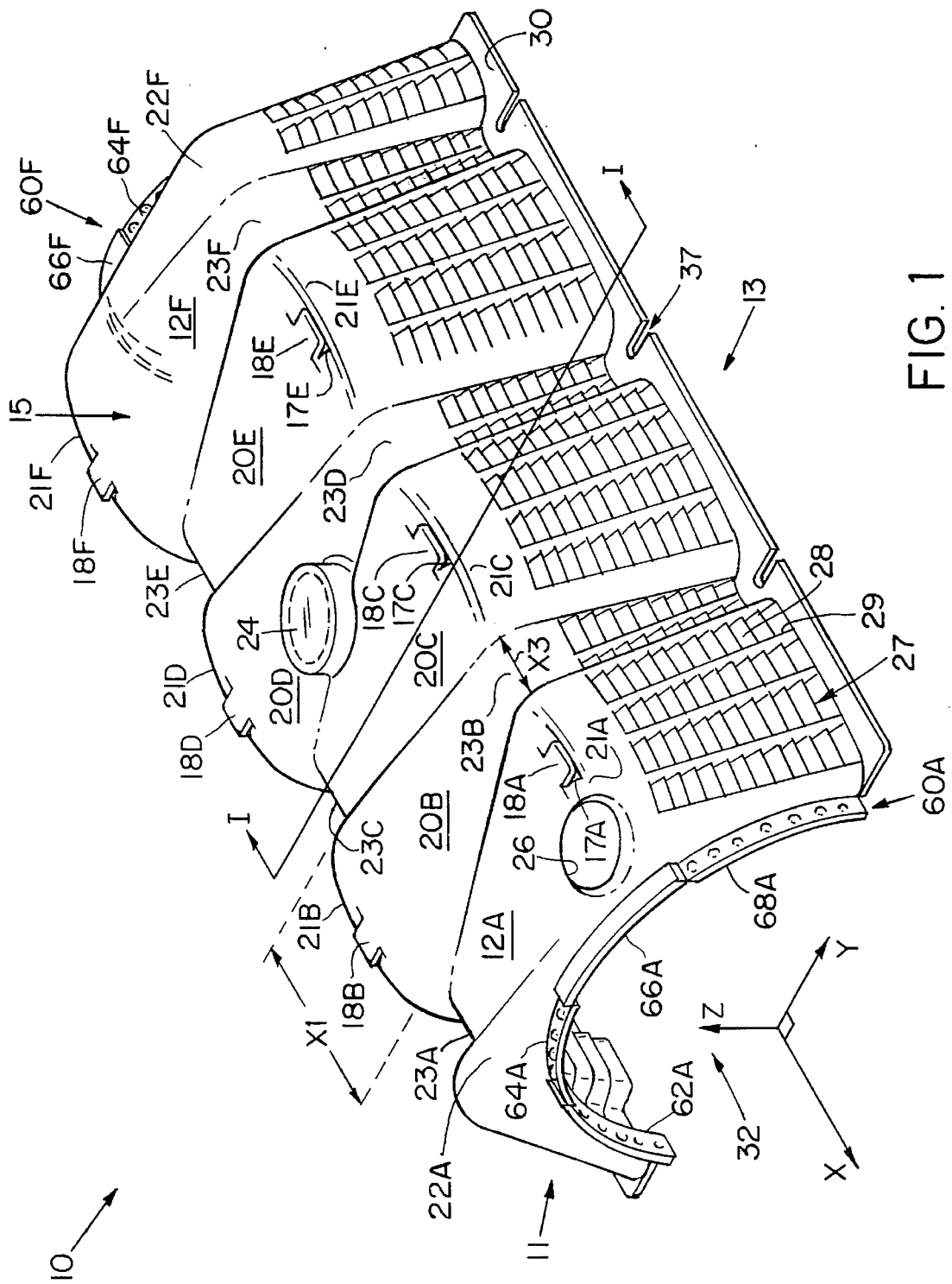
FIG. 1 is a perspective view of a preferred embodiment of a leaching chamber according to the invention.
Figure 7:
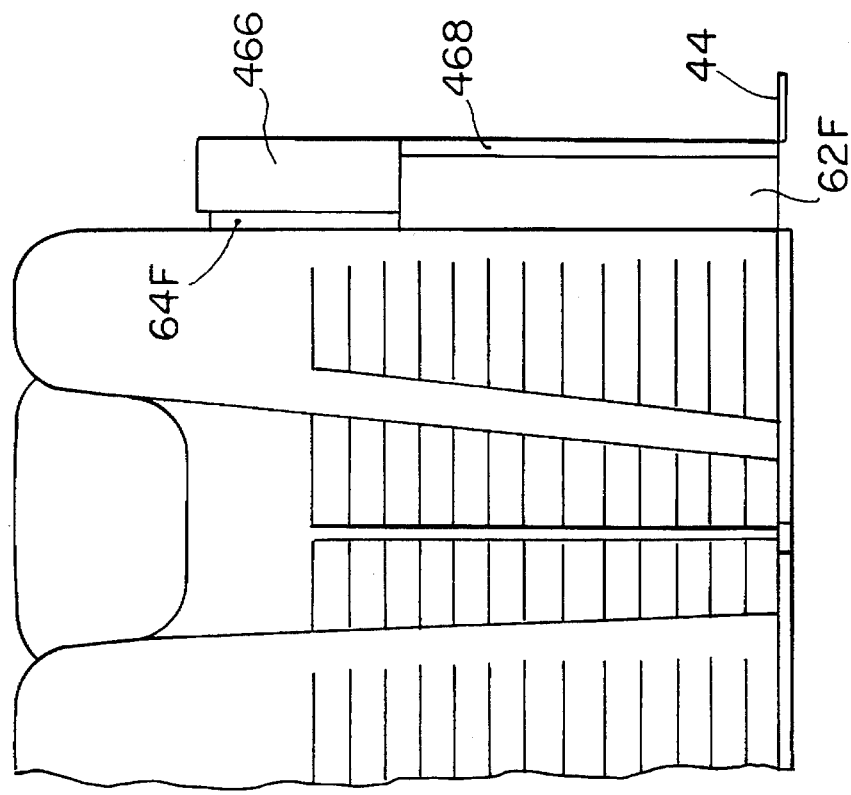
FIG. 7 is a side view of the end cap of FIG. 5 coupled to an end of the leaching chamber of FIG. 1.

FIG. 1 is a perspective view of a preferred embodiment of a leaching chamber according to the invention. The leaching chamber 10 is a corrugated plastic conduit for burial in the earth for receiving and dispersing liquids such as sewage system effluent or storm water. The liquids are discharged from a discharge pipe 52 (FIG. 8) into a central cavity 32 through a pipe access port 26. Liquids which do not disperse into the earth through the open bottom of the leaching chamber 10 are dispersed into the surrounding earth through slots 27 located on the sides 11, 13 of the leaching chamber 10. Multiple leaching chambers 10 can be connected to each other in series by a semicircular locking flanges 60 to form a continuous conduit. The open ends of the leaching chambers 10 located at the ends of the resultant conduit are closed by end caps 40 (FIG. 7).

The leaching chamber 10 has F corrugations along its length. The leaching chamber 10 preferably includes six (F=6) non-symmetrical lateral corrugations 12A, 20B, . . . , 20E, 12F which provide strength to the leaching chamber 10. There are four inner corrugations 20B, . . . , 20E between two end corrugations 12A, 12F. Each corrugation 12, 20 crosses the leaching chamber 10 in directions transverse to the longitudinal X-axis of the leaching chamber 10.

Figure 2:
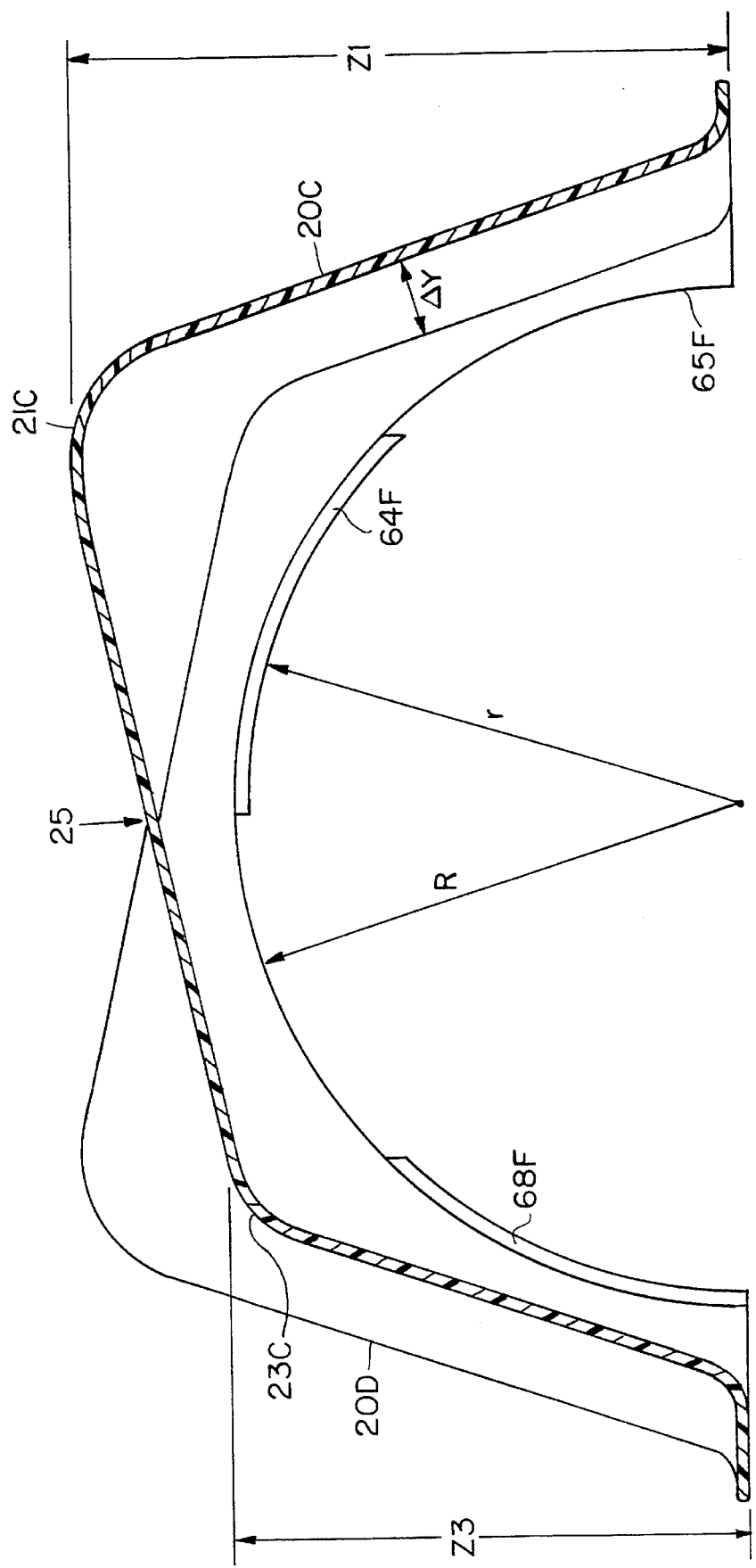
FIG. 2 is a cross-section of the leaching chamber taken along lines I—I of FIG. 1.

FIG. 2 is a cross section of the leaching chamber 10 of FIG. 1 taken along lines I—I. Each inner corrugation 20 has a ridge 21 and a shoulder 23 which are on opposite lateral edges of the leaching chamber 10. The ridge 21 of each inner corrugation 20 is higher than the shoulder 23 (i.e., Z1>Z3) and slopes down from the ridge 21 to the shoulder 23. As a result, the cross section of each inner corrugation 20 in the direction transverse to the longitudinal X-axis is non-symmetrical. Additionally, the ridge 21 is wider than the shoulder 23 in the longitudinal direction (i.e., X1>X3).

Each inner corrugation 20 is also positioned adjacent to another inner corrugation 20 in a reversed orientation such that the ridge (e.g., 21B) of one inner corrugation 20 is adjacent to the shoulder (e.g., 23C) of the adjoining inner corrugation 20. The reversed orientation of adjacent inner corrugations 20 provides a roof 15 in which portions of the lateral edges of the roof are higher than a central section 25 of the roof 15 as seen in FIG. 2. Additionally, each inner corrugation 20 is offset from the adjoining inner corrugation 20 such that the side of ridge 21 of each inner corrugation 20 extends laterally beyond the side of the shoulder 23 of each adjoining inner corrugation 20 by an offset distance ΔY. Offsetting the corrugations also strengthens the leaching chamber 10.

Figure 9:
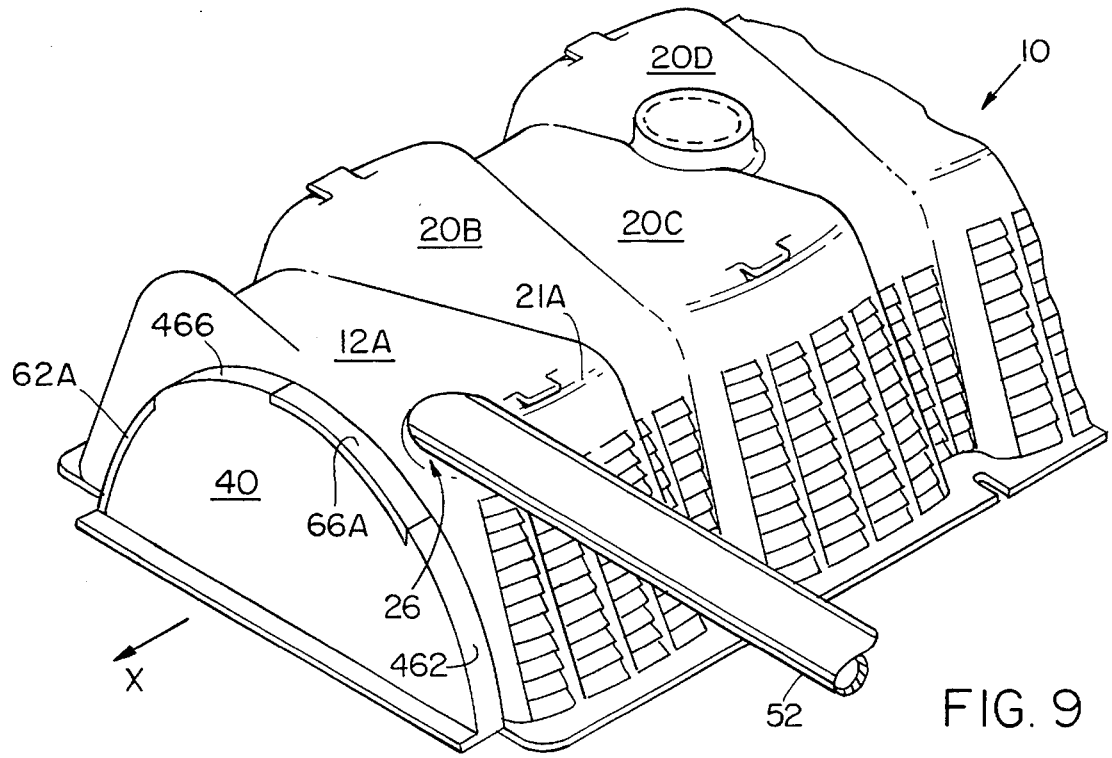
FIG. 9 is a perspective view of an end of the leaching chamber of FIG. 1 with a discharge pipe entering the access port in a direction perpendicular to the longitudinal axis of the leaching chamber.

Positioned at respective ends of leaching chamber 10 are end corrugations 12A, 12F as shown in FIG. 1. Each end corrugation 12A, 12F includes a ridge 21A, 21F, an arm 22A, 22F, and a shoulder 23A, 23F. Each ridge 21A, 21F is higher than its respective shoulder 23A, 23F and slopes down from the ridge 21A, 21F to the shoulder 23A, 23F. However, the arm 22A, 22F, which is adjacent to the shoulder 23A, 23F, is the same height as the ridge 21A, 21F. This provides each end corrugation 12A, 12F with an end wall of uniform height and allows a discharge pipe 52 to be coupled to the pipe access port 26 in a direction perpendicular to the longitudinal X-axis (FIG. 9). The side of each arm 22A, 22F extends laterally beyond the side of the respective shoulder 23A, 23F such that the arm sides and the shoulder sides are offset from each other by an offset distance ΔY in a manner similar to the sides of the inner corrugations 20B, . . . , 20E. It being understood that the arms 22 need not have the same offset distance ΔY from the shoulders 23 as do the adjacent ridges 21. The ridge 21A, 21F of each end corrugation 12 is positioned adjacent to the shoulder 23B, 23E of the adjacent inner corrugations 20B, 20E.

The resulting structure of non-symmetrical corrugations 12, 20 forms a leaching chamber 10 which has a non-symmetrical cross section in a direction along the longitudinal X-axis at least for each inner corrugation 20B, . . . , 20E. In particular, each inner corrugation 20B, . . . , 20E has a central transverse Y-axis which defines a non-symmetrical corrugation with reference to the longitudinal X-axis. The ridges 21 and shoulders 23 of the corrugations 12, 20 and the arms 22 of the end corrugations 12 are curved to provide a smooth transition between each other resulting in a continuous series of smooth curves. The center of each ridge is higher than the edges.

The non-symmetrical corrugations of leaching chamber 10 provides a structure with about a 10% greater internal volume than if the roof was arch-shaped. In particular, a preferred leaching chamber is about 76 inches long and has a capacity of about 18 ft$^3$. As a result, the amount of liquids that the leaching chamber 10 can receive and disperse is about 10% greater than an arch-shaped leaching chamber having roughly the same base and height dimensions.

Figure 3:
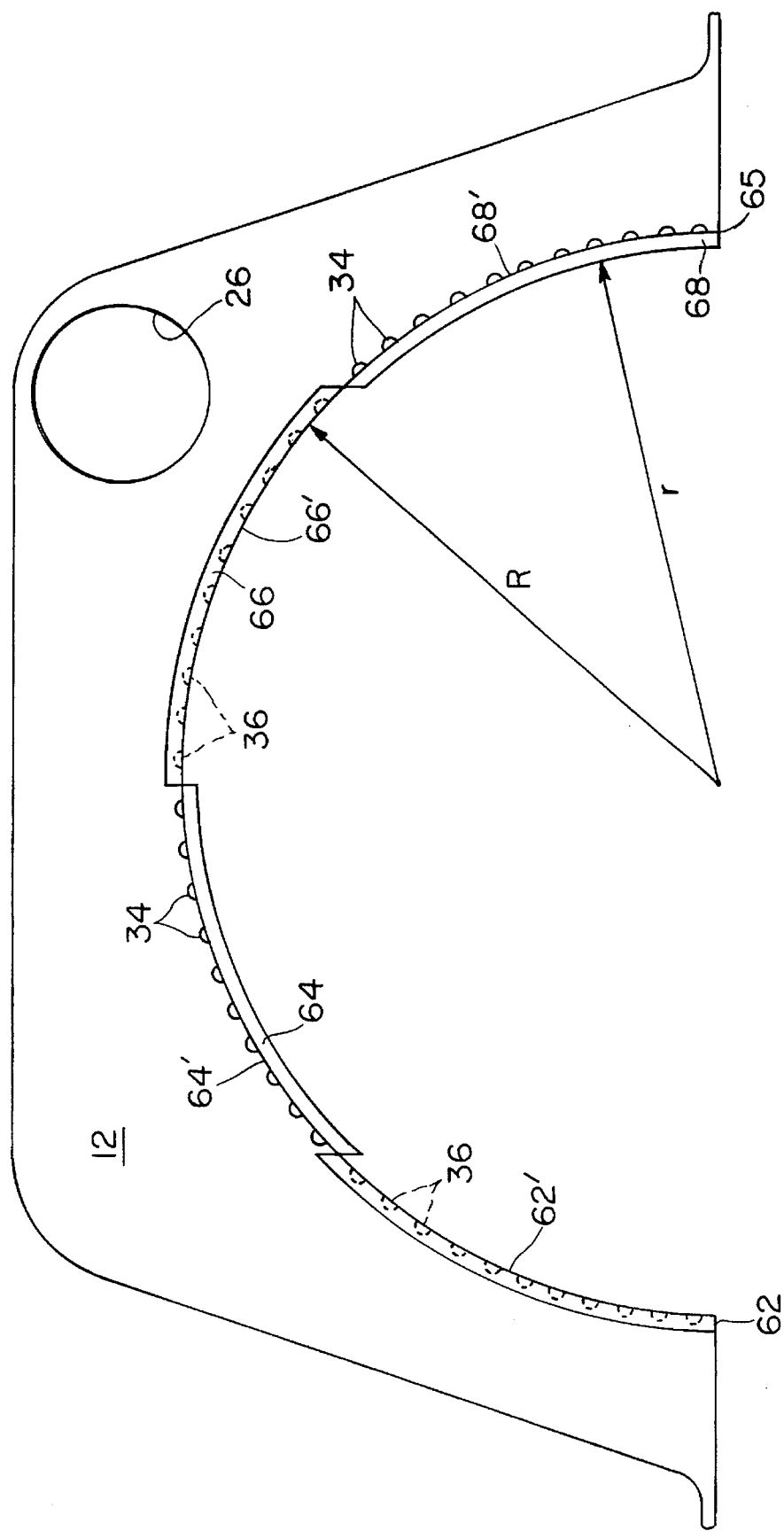
FIG. 3 is an end view of the leaching chamber of FIG. 1.

FIG. 3 is an end view of the leaching chamber 10 of FIG. 1. The locking flange 60 extends from each end corrugation 12 for locking leaching chamber 10 to another like leaching chamber 10' (FIG. 4) or for locking end caps 40 (FIG. 7) to the ends of the leaching chamber 10. Locking flanges 60 include curved overlapping flange members 62, 66 and overlapped flange members 64, 68. The overlapping flange members 62, 66 have a larger minor radius than overlapped flange members 64, 68 (i.e., R>r) and are offset from them. The arm 22A, 22F allows the locking flange 60A, 60F to have a larger radius R than if the arm 22A, 22F was the same height as the shoulder 23A, 23F. In particular, the series of flange members 62, 64, 66, 68 alternate about a common reference curve (or line) 65, having a radius R and which defines a matable surface 62', 64', 66', 68' of each flange member 62, 64, 66, 68.

As illustrated, the flanges 60A, 60F of each leaching chamber 10 are a mirror image of each other. This allows an installed leaching chamber to be connected to either end of the next leaching chamber. As such, there is no need for an installer to find the mating end of the next chamber, thus reducing the installation time of a leaching field.

Although the locking flange 60 is shown to have four flange members, alternatively, the locking flange 60 can have more than four flange members or less than four flange members. In addition, the flanges 60 need not be mirror images of each other, especially where an odd number of flange members are used. Furthermore, the reference curve 65 need not be semicircular, but can form any symmetrical or asymmetrical outline. Moreover, the reference curve 65 can include curve or line segments abutting at acute angles along the length of the reference curve 65.

As illustrated, the overlapping flange members 62, 66 include indents 36 on their matable (i.e., inner) surfaces 62', 66' while the overlapped flange members 64, 68 include protrusions 34 on their matable (i.e., exterior) surfaces 64', 68'. It being understood that the protrusions 34 and indents 36 can be formed on or in the overlapping flange members 62, 66 and overlapped flange members 64, 68, respectively. The protrusions 34 and indents 36 on the locking flange 60 mate with respective protrusions and indents of a locking flange on an end cap 40 or an adjoining leaching chamber 10' to prevent movement in the axial direction. In another preferred embodiment of the invention, the protrusions 34 and indents 36 are omitted from some or all of the flange members.

Returning to FIG. 1, the sides of the inner corrugations 20B, . . . , 20E and the sides of the end corrugations 12A, 12F are rounded and include slots 27 formed between louvers 28. A series of ribs 29 provide strength and separate rows of louvers 28 and slots 27 from each other. The slots 27 allow liquids to exit leaching chamber 10 and disperse into the surrounding earth. The louvers 28 are angled downward to prevent earth from entering the leaching chamber 10 through the slots 27. The slots 27 and the louvers 28 preferably wrap slightly around the curved corners of the sides for providing maximum liquid dispersion. Alternatively, the slots 27 and the louvers 28 can be made without curved portions (i.e. squared) for easier manufacturing.

The bottom of leaching chamber 10 includes base flanges 30. Slots 37 within the base flange 30 allow a plurality of leaching chambers 10 to be lifted from a stack by inserting knotted ropes into the slots 37 on a selected leaching chamber 10 anywhere on the stack and lifting a plurality of leaching chambers 10 from the stack with a crane.

The roof 15 of leaching chamber 10 includes a centrally located knockout 24 which can be removed to form an inspection port for inspecting the interior of the leaching chamber 10 after installation. Additionally, another knockout forming a pipe access port 26 is located on the ridge 21 of each end corrugation 12A, 12F laterally offset from the longitudinal X-axis and can be removed to provide access for a discharge pipe. The access port 26 is recessed into the corner of the ridge 21A, 21F such that the access port 26 appears to be circular when viewed along the longitudinal X-axis as well as from transverse Y-axis of the leaching chamber 10. The access port 26 provides access for a discharge pipe 52 to discharge effluent or storm water into leaching chamber 10 and allows the installation of discharge pipes after the leaching chamber 10 has been moved into its proper position and connected to other leaching chambers.

A series of optional vents 17 can be located on the ridges 21A, . . . , 21F to allow air to be vented from within the central cavity 32 of the leaching chamber 10. This enables liquids to enter the leaching chamber 10 more rapidly. Preferably, the vents 17 are knockouts. Usually, the vents 17 are employed only for dispersing storm water. The vents 17 preferably have a lip louver 18 to prevent earth from entering the central cavity 32 from above the leaching chamber 10. For use in sewage systems, the knockouts are preferably left in place so there are no vents 17.

Figure 4:
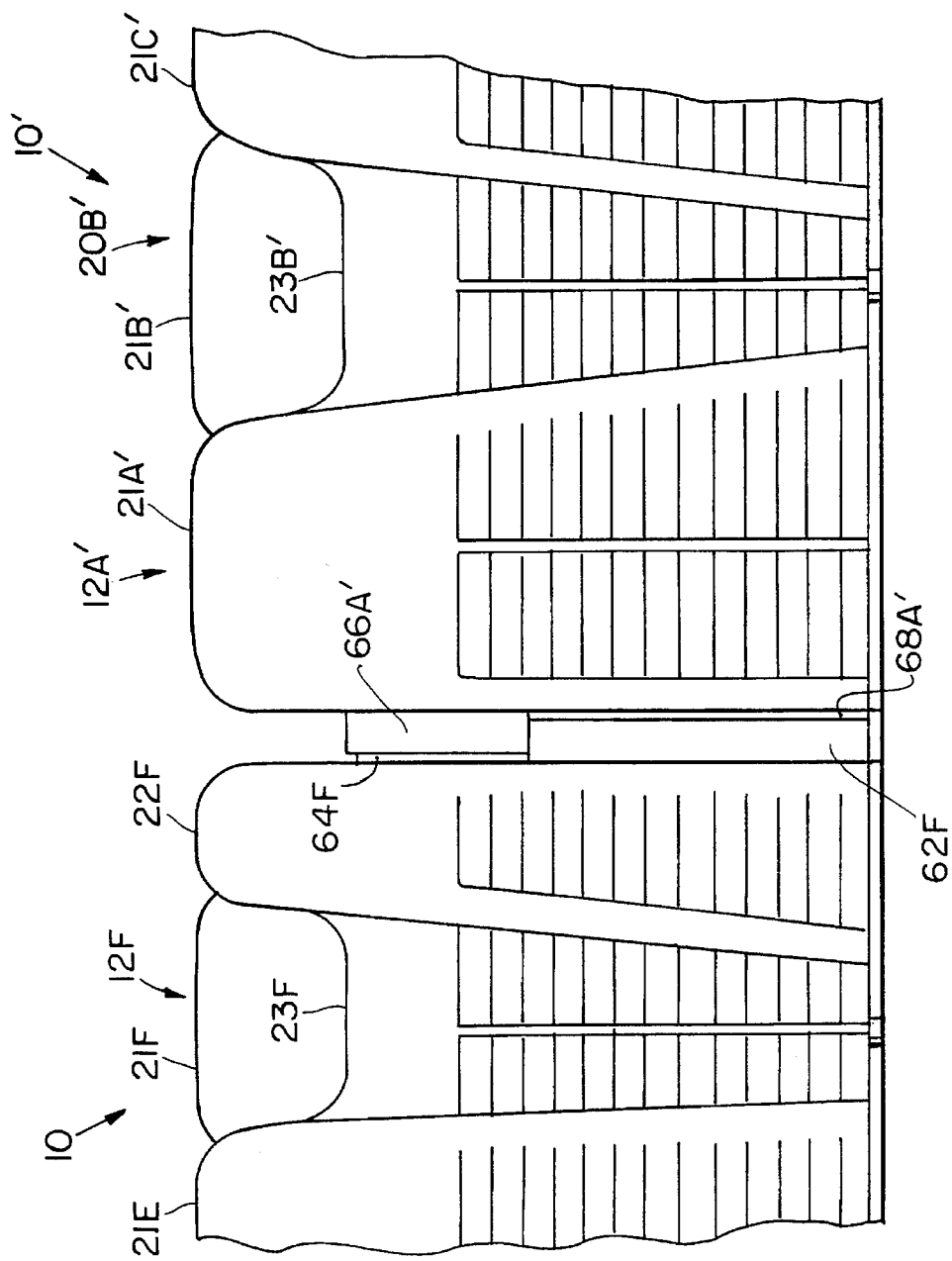
FIG. 4 is a side view of two leaching chambers coupled together.

FIG. 4 is a side view of two leaching chambers 10, 10' coupled together. The two leaching chambers 10, 10' are coupled together by their respective locking flanges 60F, 60A'. The overlapping flange members 62F, 66F(not shown) of leaching chamber 10 fit over the respective overlapped flange members 68A', 64A' (not shown) of leaching chamber 10'. Additionally, the overlapped flange members 64F, 68F(not shown) of leaching chamber 10 fit under the respective overlapping flange members 66A', 62A' (not shown) of leaching chamber 10'. The protrusions 34 on the overlapped flange members 64, 68 mate with indents 36 in the overlapping flange members 62, 66. This prevents axial movement of the leaching chambers 10, 10' relative to each other.

Figure 5:
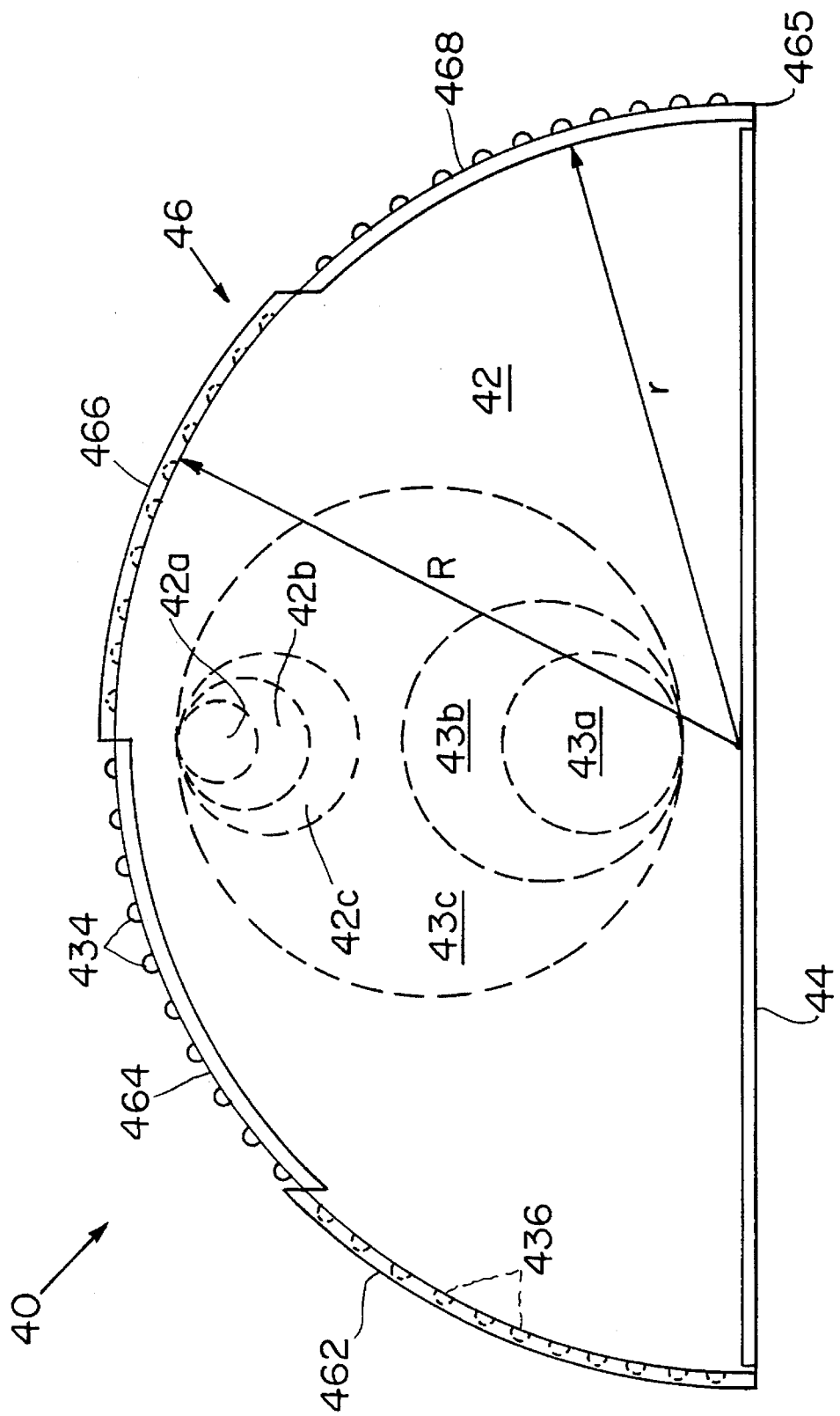
FIG. 5 is a rear view of an end cap for enclosing the ends of the leaching chamber of FIG. 1.

FIG. 5 is a rear view of an end cap 40 for enclosing the ends of the leaching chamber 10 of FIG. 1. The end cap 40 includes a semi-circular end wall 42 having knockouts 42a, 42b, 42c which can be removed to provide access for various standard-sized discharge pipes. The end cap 40 also includes outlined targets 43a, 43b, 43c which can be sawed out and removed to provide access for standard-sized discharge pipes. The end cap 40 includes a lower flange 44 which provides strength and stiffness to the end wall 42.

Figure 6:
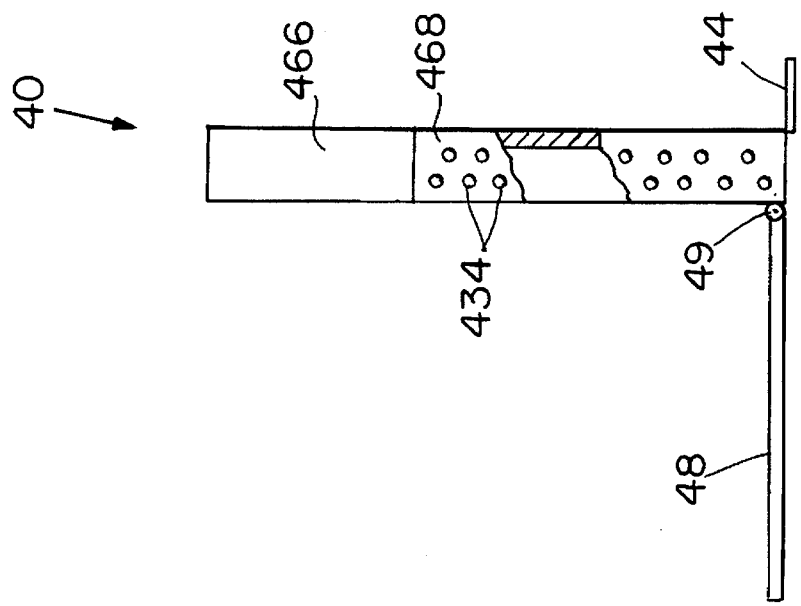
FIG. 6 is a side view of the end cap of FIG. 5 with a portion of a flange member broken away.

FIG. 6 is a side view of the end cap 40 of FIG. 5 with a portion of a flange member 468 broken away. A splash plate 48 extends from the bottom of the end wall 42 and may include a hinge 49 so the splash plate 48 can pivot. The splash plate 48 protects the earth from being eroded under the leaching chamber 10 by liquids discharged into the leaching chamber 10 through the access hole 26. Although the end wall 42 is depicted to be substantially solid, the end wall 42 can include louvers and slots to permit liquids to exit the leaching chamber 10 through the end cap 40.

Returning to FIG. 5, curved locking flange 46, similar to the locking flange 60 of the leaching chamber 10, extends from the end wall 42. The locking flange 46 includes overlapping flange members 462, 466 and overlapped flange members 464, 468 which are offset from each other to mate and lock with the chamber locking flange 60. The flange members 462, 464, 466, 468 alternate about a common reference curve 465 corresponding to the reference curve 65 of the leaching chamber 10. That is, the reference curve 465 of the end cap 40 outlines a semicircle of radius R.

FIG. 7 is a side view of the end cap 40 of FIG. 5 coupled to an end of the leaching chamber 10 of FIG. 1. The overlapping flange members 462, 466 of end cap 40 fit over the overlapped flange members 68 and 64 of the leaching chamber 10 while the overlapped flange members 464, 468 of the end cap 40 fit under the overlapping flange members 66, 62 of the leaching chamber 10.

Figure 8:
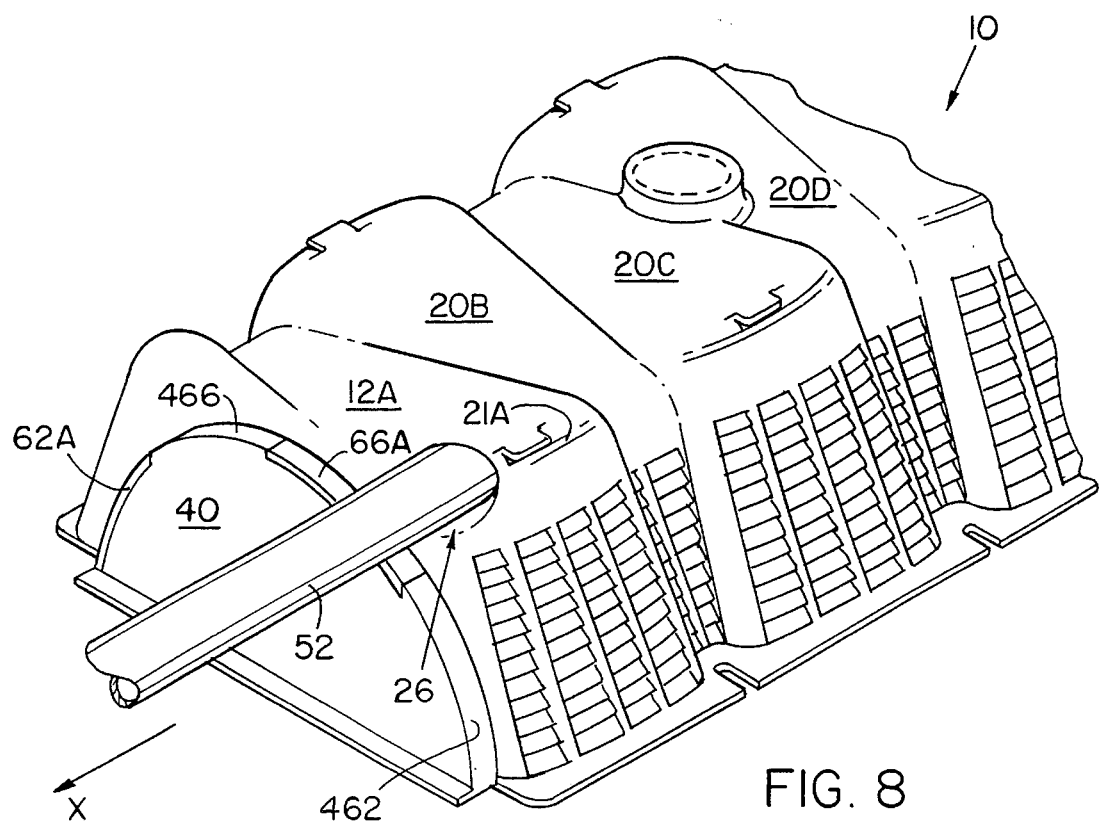
FIG. 8 is a perspective view of an end of the leaching chamber of FIG. 1 with a discharge pipe entering the access port in a direction parallel to the longitudinal axis of the leaching chamber.

FIGS. 8 and 9 are perspective views depicting the manner in which a discharge pipe 52 for discharging liquids into the leaching chamber 10 can be coupled to the access port 26. The access port 26 is located on the corner of the ridge 21A of the end corrugation 12A and is configured to allow a discharge pipe 52 to be coupled to the leaching chamber 10 from at least two different directions. It is desirable for the discharge pipe 52 to be coupled to the highest point possible on the leaching chamber 10. In prior art arch-shaped leaching chambers, this point is near the top of the arch along the center line of the leaching chamber.

In the present invention leaching chamber 10, the highest and most suitable point is on the ridge 21A which is offset from the longitudinal X-axis. In FIG. 8, the discharge pipe 52 is inserted into the access port 26 from the direction parallel to the longitudinal X-axis of the leaching chamber 10. In FIG. 9, the discharge pipe 52 is inserted into the access port 26 from the direction perpendicular to the longitudinal X-axis of the leaching chamber 10. The discharge pipe 52 can be inserted from any angle between the two positions illustrated if an adapter (not shown) is used to couple the discharge pipe 52 to the access port 26. Such an adapter can be a fixed angle (e.g., 45°) adapter or a variable angle (i.e., 0°–90°) adapter. By allowing the discharge pipe 52 to be coupled to the access port 26 from more than one direction, more flexibility is provided for coupling the discharge pipe 52 to the leaching chamber 10. Other methods of introducing liquids into the leaching chamber 10 can be used.

Figure 10:
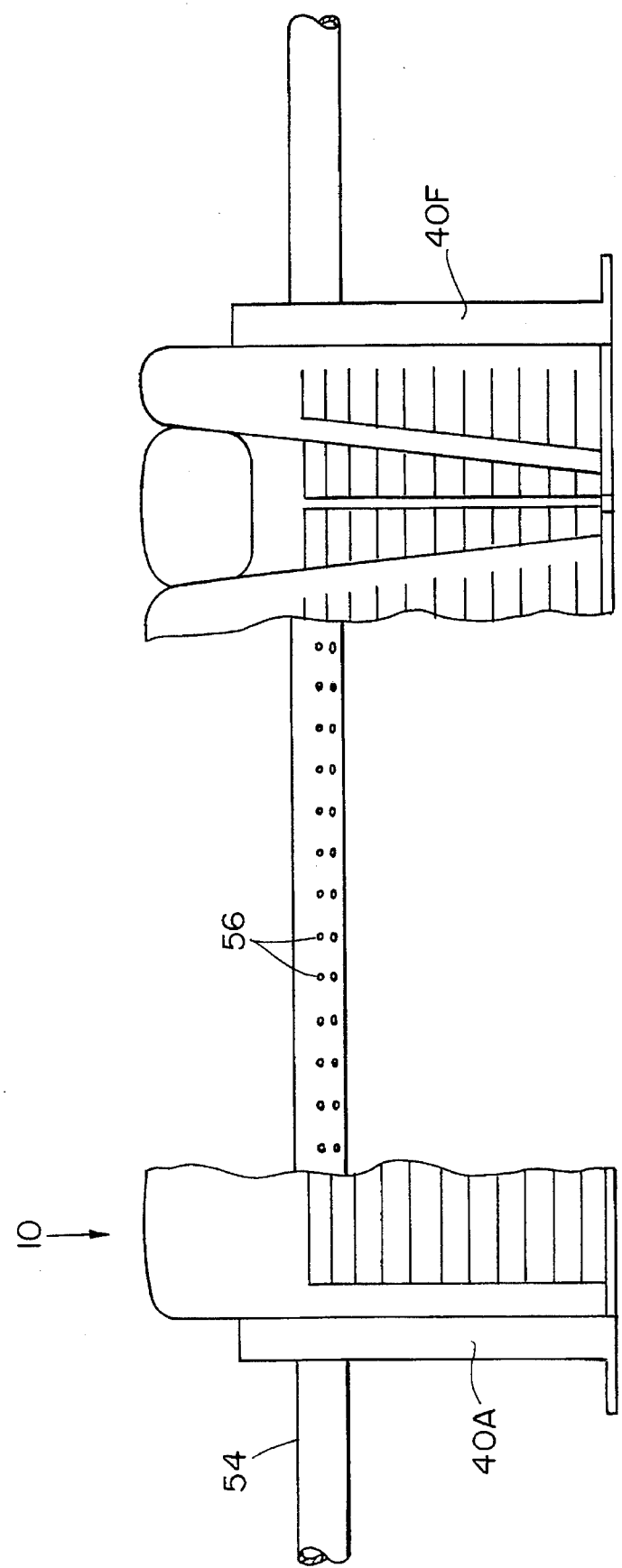
FIG. 10 is a side view of the leaching chamber of FIG. 1 with a portion broken away to show a discharge pipe extending through the leaching chamber.

FIG. 10 is a side view of the leaching chamber 10 of FIG. 1 with a portion broken away to show a discharge pipe 54 extending through the leaching chamber 10. In particular, a pressurized discharge pipe 54 passes through the leaching chamber 10 and through holes 42, 43 knocked or sawed out in the end caps 40. The pressurized discharge pipe 54 includes holes 56 which allow liquids within the pressurized discharge pipe 54 to enter the leaching chamber 10. The pressure of liquids within the pressurized discharge pipe 54 allows liquids to be evenly distributed within the leaching chamber 10. A pressurized pipe can also be connected to the leaching chamber 10 through the access port 26.

FIG. 11 is a top view of an array 100 of leaching chambers 10 coupled to a series of discharge pipes 52. The discharge pipes 52 are connected to the leaching chambers 10 in two different ways. Rows 100A and 100B are each supplied by a single discharge pipe 52a, 52b which in turn are supplied by a common pipe 53. Alternatively, in row 100C, every leaching chamber 10c, 10c', 10c'' is supplied by at least one individual discharge pipe 52c, 52c', 52c'' which can be used to increase the flow of liquid into the leaching chambers 10c, 10c', 10c''. Although each leaching chamber 10 is shown coupled to at most one discharge pipe 52, there are two access ports 26 on each leaching chamber. Consequently, any or all leaching chambers 10 in the array 10 can be connected to two discharge pipes 52 to increase the flow rate into the leaching chambers 10.

FIG. 12 is a flow chart of the manufacturing process by which the present invention leaching chamber 10 is manufactured. In step 70, the leaching chamber is first designed, preferably by computer-aided design (CAD) but, alternatively, can be manually drawn on paper. In step 72, a mold for molding the leaching chamber is designed. In step 74, the mold is fabricated, preferably in two or more parts or sections. In step 76, the mold is mounted in an injection molding press. In step 78, the mold is closed and plastic is injected into the mold in step 80. In step 82, the mold is cooled with water. In step 84, the mold is opened and the molded leaching chamber is removed in step 86. The leaching chamber is then nested on a pallet in step 88. If multiple leaching chambers are desired, steps 78 through 88 are then repeated. Although the present invention leaching chamber is preferably injection molded from plastic, alternatively, leaching chamber 10 can be made by other suitable methods such as by stamping or forging a sheet or blank of plastic.

Figure 13:
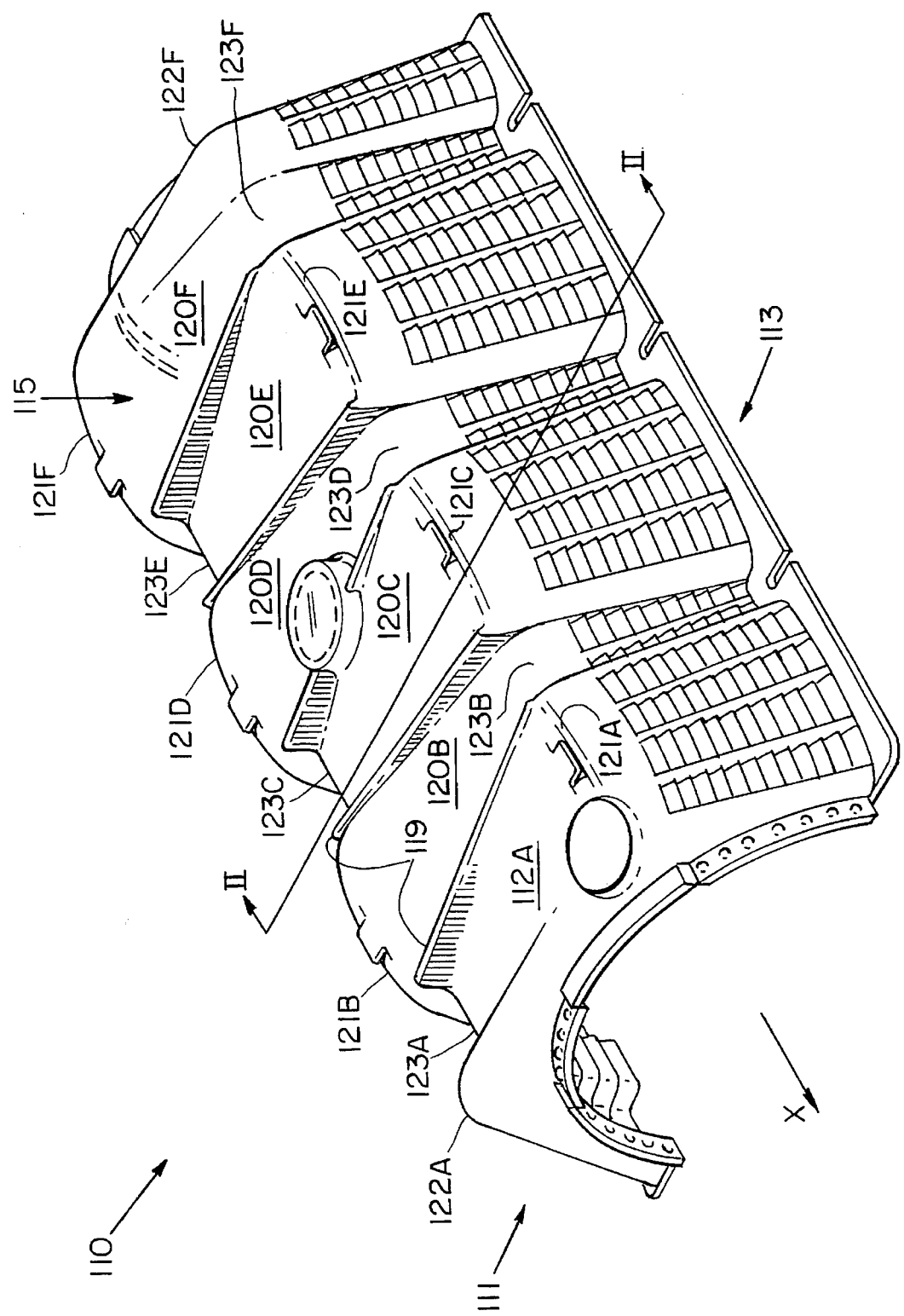
FIG. 13 is a perspective view of another preferred embodiment of the invention.

FIG. 13 is a perspective view of another preferred embodiment of the invention. The leaching chamber 110 is similar to the aforementioned leaching chamber 10 but differs in that a series of external webs 119 extend across the roof 115 of the leaching chamber 110 between the sides 111 and 113 to provide strength. The webs 119 connect the adjacent inner corrugations 120 to each other as well as connect the end corrugations 112 to the adjacent inner corrugations 120.

Figure 14:
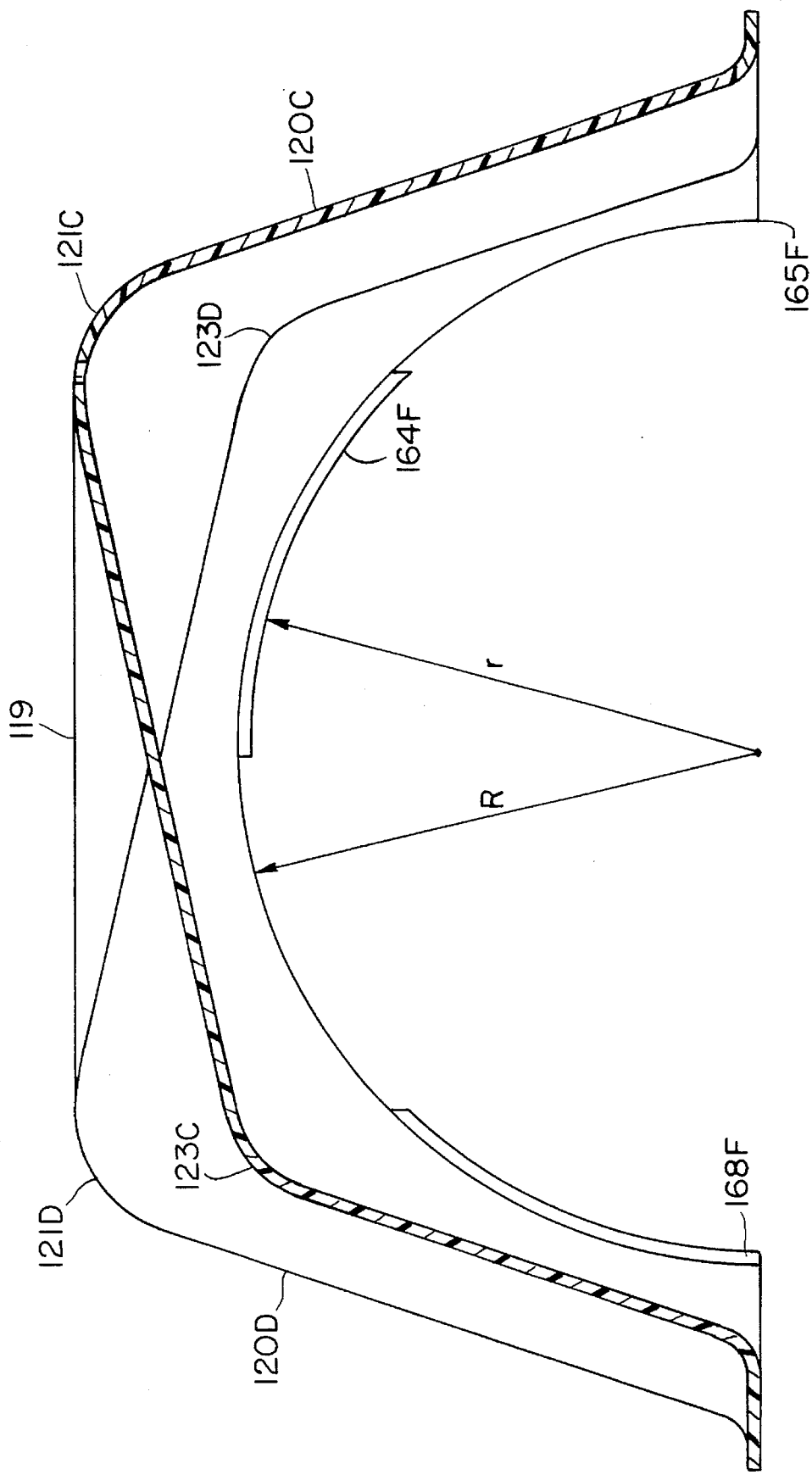
FIG. 14 is a cross-section of the leaching chamber of FIG. 13 taken along lines II—II.

FIG. 14 is a cross section of the leaching chamber 110 of FIG. 13 taken along lines II—II. The webs 119 extend from the top of a ridge 121 from one corrugation to the top of a ridge 121 of an adjacent corrugation 20. Each web 119 curves smoothly into the adjacent corrugation 112, 120 to provide a smooth transition between the corrugations and the webs.

Figure 15:
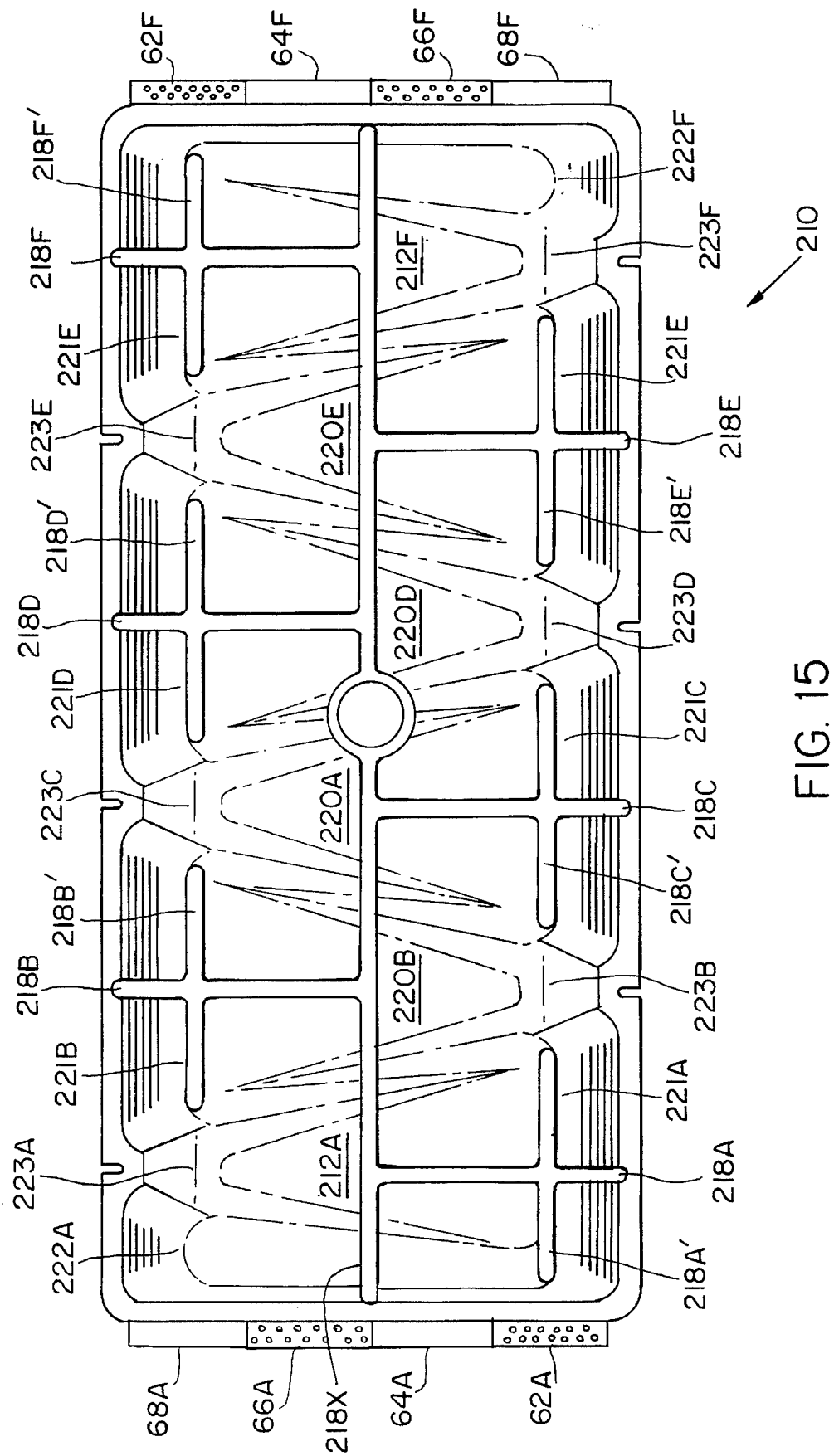
FIG. 15 is a bottom view of another preferred embodiment of the invention.

FIG. 15 is a bottom view of another preferred leaching chamber 210 of the invention. The interior of the corrugations 212, 220 preferably have webs or structural ribs 218 to increase the strength of the leaching chamber 210. However, because the leaching chamber 210 must be stackable for transportation, the size of the internal structural ribs must be kept to a minimum. As a result, the majority of the structural strength of leaching chamber 210 is provided by the corrugations 212 and 220. Alternatively, corrugations 212 and 220 can be made without internal ribs or webbing.

As illustrated, there is a longitudinal web 218X running the length of the leaching chamber 210 along the longitudinal X-axis. Each corrugation 212A, 220B, . . . , 220E, 212F also has a transverse rib 218A, . . . , 218F extending along the transverse Y-axis from the longitudinal rib 218X to the respective ridge center 221A, . . . , 221F of that corrugation. The transverse ribs 218A, . . . , 218F is preferably curved to follow the contour of the slope of the corrugations 212, 220. Each corrugation can also have a longitudinal rib 218'A, . . . , 218'F at the respective ridge 221A, . . . , 221F, which also follows the contour of the ridge 221. The need for internal stiffening depends in part on the material used for the leaching chamber 210 and the dimensions of the corrugations 212, 220. In a preferred embodiment, a transverse rib is not used on the shoulder side of the longitudinal rib 218X because the shoulder side is narrower than the ridge side.

Figure 16:
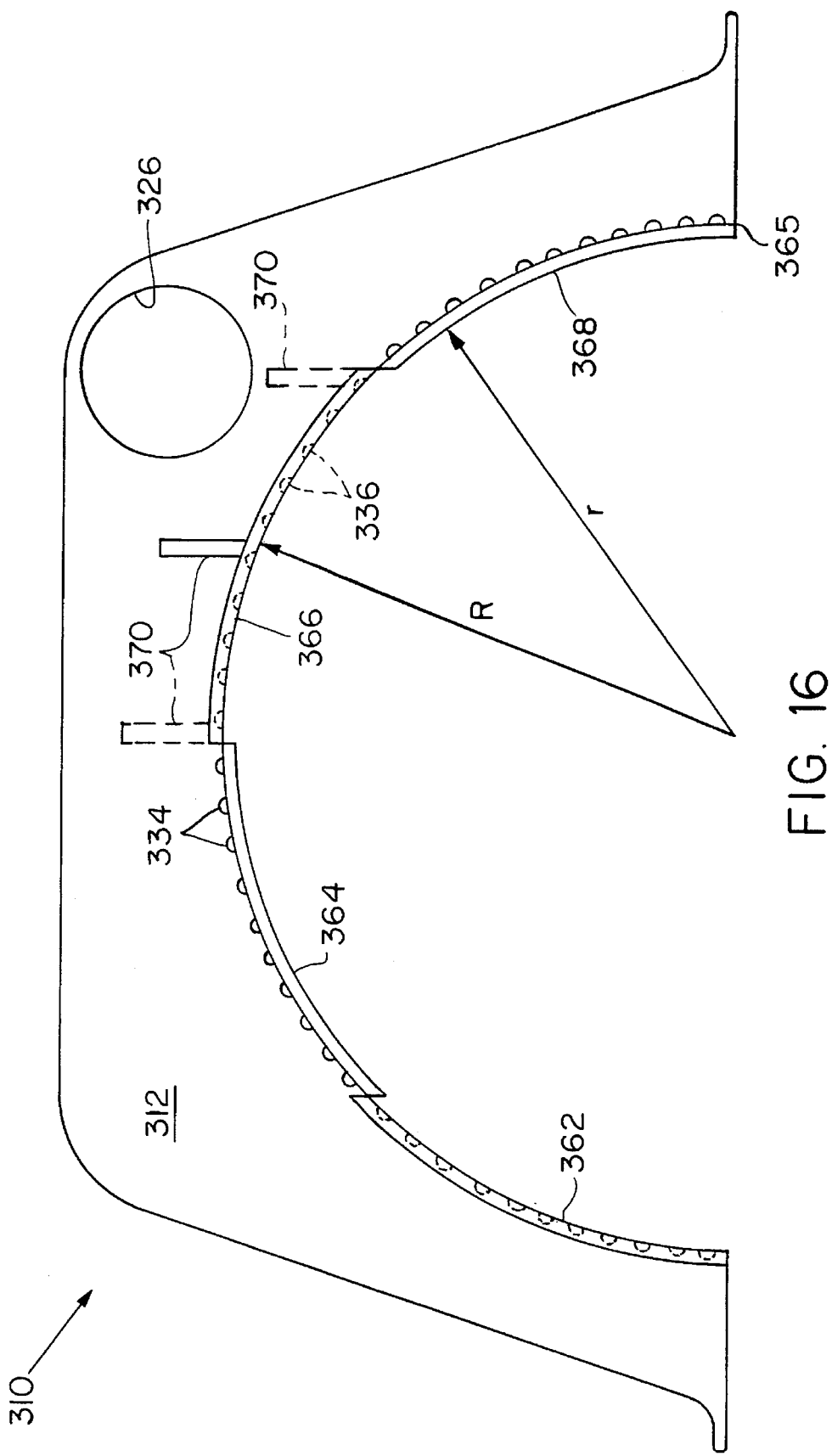
FIG. 16 is an end view of a leaching chamber according to the invention having gusset-supported flange members.

FIG. 16 is an end view of a leaching chamber according to the invention having gusset-supported flange members. The leaching chamber 310 includes a series of flange member 362, 364, 366, 368, which are essentially identical to the flange members 62, 64, 66, 68 of FIG. 3. The flange members 362, 364, 366, 368 alternate about a semicircular reference curve 365 of radius R. The upper overlapping flange member 366 is braced to the end wall of the leaching chamber 310 by at least one gusset 370. The gussets 370 provide additional vertical structural support at the flange joint.

FIGS. 17A and 17B are cross sectional schematic diagrams of mating flange members of FIG. 16. In FIG. 17A, two leaching chambers 310, 310' are not connected. In FIG. 17B the two leaching chambers 310, 310' are mated together such that the protrusions 334' on the overlapped flange member 364' are registered to the indents 336 in the overlapping flange member 366. Although each of the indents 336 is shown to correspond with a respective protrusion 334' such an arrangement of indents requires fairly precise alignment during the design and fabrication of the leaching chamber 10. To ease manufacture, the indents 336 can be replaced by grooves or channels.

FIGS. 18A and 18B are cross sectional schematic diagrams of mating flange members with a saw tooth coupling. In FIG. 18A, a pair of leaching chambers 410, 410' are about to be mated. In FIG. 18B, the leaching chambers 410, 410' are mated with the flange members 466, 464' interlocked. The saw teeth 434, 434' are registered to a respective groove 436', 436 to create a secure coupling. In a particular preferred embodiment of the invention, the overlapping flange member 466 is curled upward at the end and the overlapped flange member 464' is curved down at the end to facilitate mating between the two conduits 410, 410'.

Figure 19:
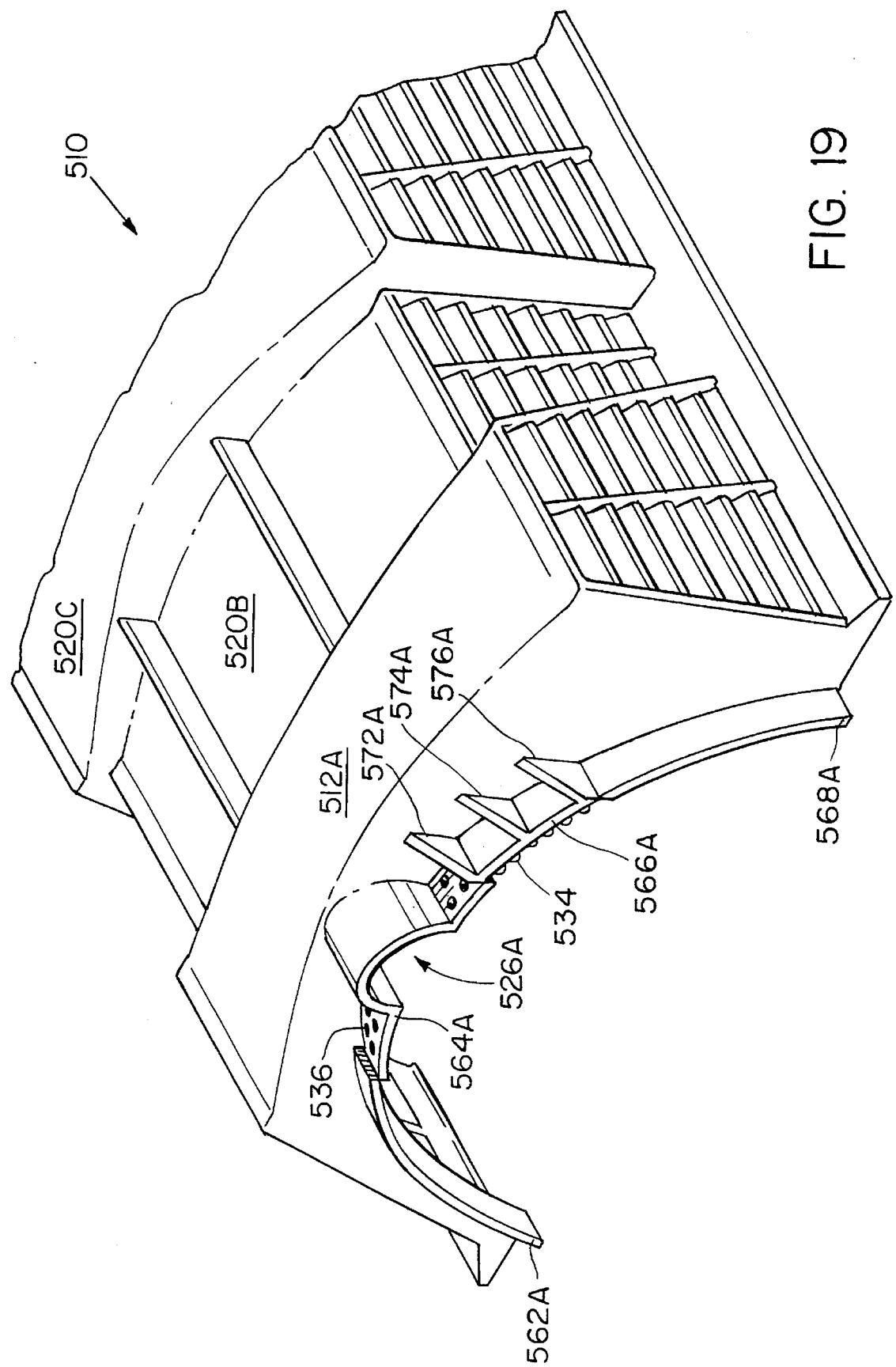
FIG. 19 is a foreshortened perspective view of another leaching chamber according to the invention.

Although the above description focuses on leaching chambers having non-symmetrical geometries, the flange 60 can be adapted for use with leaching chambers having alternating peak corrugations and valley corrugations. FIG. 19 is a foreshortened perspective view of another leaching chamber 510 according to the invention. The leaching chamber 510 is an arch-shaped conduit having N alternating peak (e.g., 512A, 520C) and valley corrugations (e.g., 520B) along its length. Basic arch-shaped conduits are described in U.S. Pat. No. 4,759,661 to James M. Nichols entitled "Leaching System Conduit" and which issued on Jul. 26, 1988, the teachings of which are incorporated herein by reference in their entirety. Preferably, as illustrated, the leaching chamber 510 includes a sub-arch region 526A, 526N(not shown) at the ends of the leaching chamber 510. Such leaching chambers are described in U.S. Design Patent No. 329,684 to Terrance H. Gray entitled "Leaching Chamber" which issued on Sep. 22, 1992 and in U.S. Pat. No. 5,156,488 to James M. Nichols entitled "Leaching System Conduit With Sub-Arch" which issued on Oct. 20, 1992, the teachings of which are incorporated herein by reference in their entirety.

Instead of using a simple shiplap joint with clips or legs, the present leaching chamber 510 has a flange 560 that includes alternating flange members 562, 564, 566, 568. The flange members 562, 564, 566, 568 alternate about a common reference curve 565 which defines a matable surface of each flange member. As illustrated, an upper overlapped flange member 564A defines the opening of the sub-arch 526A. As such, the reference curve is not semicircular, but is instead comprised of a plurality of curve segments joined together. Although the flanges 560A, 560N are not mirror images of each other, they can be made so by abutting the upper flange members 564, 566 at the top of the sub-arch 526.

A plurality of indents 536 are formed in the upper overlapped flange member 564A. A plurality of protrusions 534 are formed on an upper overlapping flange member 566A. Preferably, the remaining flange members 562A, 568A have flush matable surfaces. In addition, the matable surfaces in the sub-arch region are also flush.

As illustrated, the upper overlapping flange member 566A can also include a plurality of supporting gussets 572A, 574A, 576A to fix an upper overlapping flange member 566A to the end wall of the leaching chamber 510. There are preferably one, two or three gussets evenly distributed along the upper overlapping flange members 566A, 566N.

Figure 20:
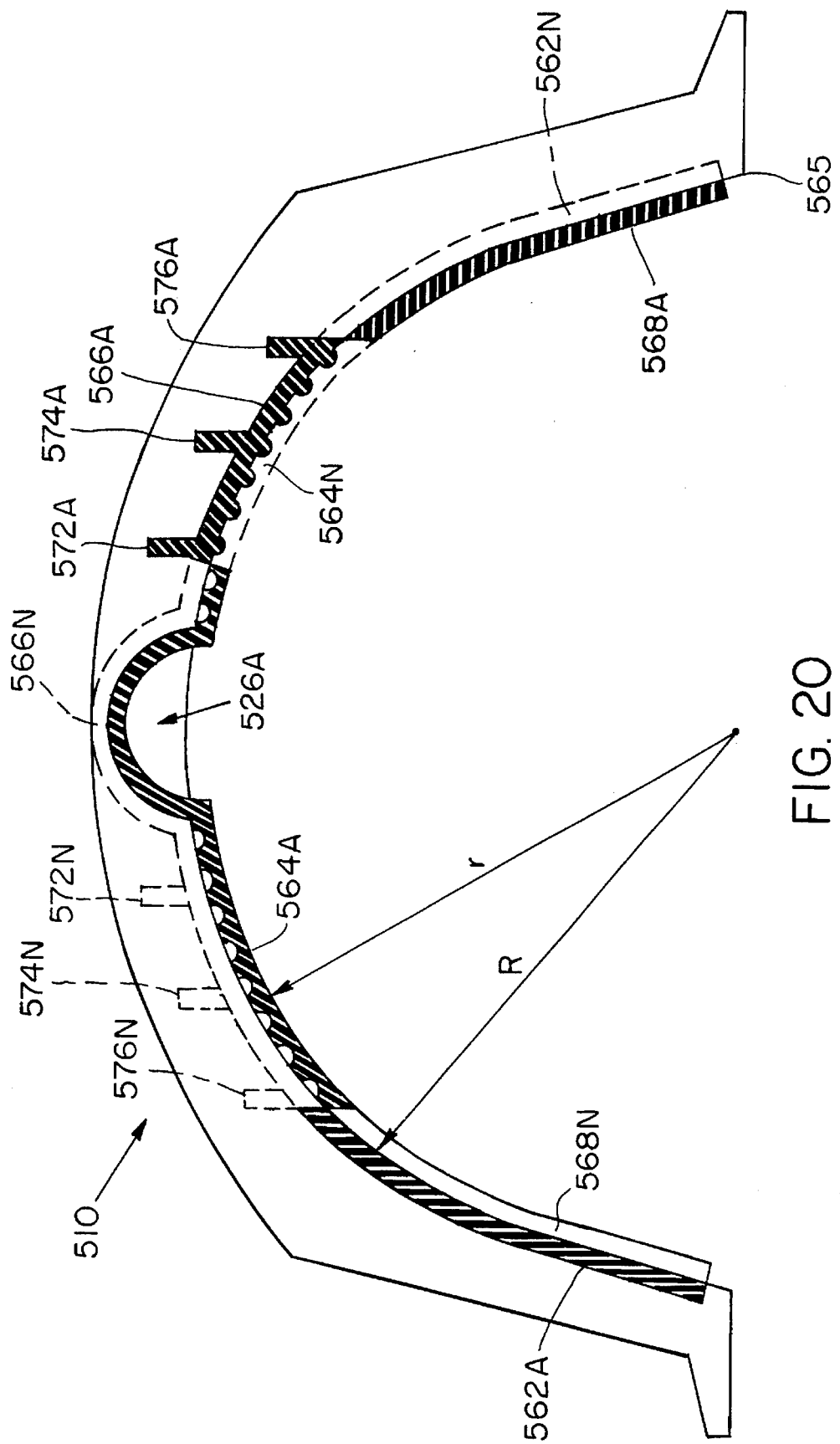
FIG. 20 is an end view of the leaching chamber of FIG. 19.

FIG. 20 is an end view of a leaching chamber 510 of FIG. 19. Shown in cross section are the sub-arch 526A, the flange members 562A, 564A, 566A, 568A and the gussets 572A, 574A, 576A. Also shown are the matable flange members 562N, 564N, 566N, 568N on the opposite end corrugation 512N.

The leaching chambers described herein are preferably fabricated from high density polyethylene (HDPE). In particular, the leaching chambers are fabricated from T60–800 HDPE. The wall thickness is preferably between 0.200 and 0.250 inches, which provides for a 76 inch, 18 $ft^3$ leaching chamber (FIG. 1). Alternatively, the leaching chambers 10, 110 can be made of other suitable polymers or from other materials such as concrete, ceramics or metals.

Equivalents

While this invention has been particularly shown and described with references to preferred embodiments thereof, it will be understood by those skilled in the art that various changes in form and details may be made therein without departing from the spirit and scope of the invention as defined by the appended claims. For example, although the present invention leaching chamber has been shown to have an open bottom, the bottom may be closed. Additionally, the non-symmetrical corrugations in the present invention can be employed for other purposes such as for forming tunnels or free standing structures.

What is claimed is:

1. A hollow load bearing structure having a height and a longitudinal axis, the structure comprising a locking flange at a longitudinal end of the structure for locking the structure to a like structure, the locking flange including a series of flange members alternating about a common reference curve which defines a matable surface boundary of each flange member.

2. The structure of claim 1 further comprising a plurality of corrugations extending in directions transverse to the longitudinal axis.

3. The structure of claim 2 wherein each corrugation is symmetrical about the longitudinal axis.

4. The structure of claim 2 wherein at least one corrugation is non-symmetrical about the longitudinal axis.

5. The structure of claim 1 wherein each corrugation has a cross-section in a direction transverse to the longitudinal axis that is symmetrical.

6. The structure of claim 1 wherein each corrugation has a cross-section in a direction transverse to the longitudinal axis that is non-symmetrical.

7. The structure of claim 1 further comprising a plurality of corrugations along the longitudinal axis, wherein adjoining corrugations are laterally offset from each other relative to the longitudinal axis.

8. The structure of claim 1 in which the structure is a conduit.

9. The structure of claim 8 in which the conduit is for burial in the ground.

10. A conduit having a height and a longitudinal axis, the conduit comprising a locking flange at a longitudinal end of the conduit for locking the conduit to another like conduit, the locking flange including a series of flange members alternating about a common reference curve which defines a matable surface boundary of each flange member.

11. The conduit of claim 10 further comprising a plurality of corrugations extending in directions transverse to the longitudinal axis, at least one corrugation being non-symmetrical about the longitudinal axis.

12. The conduit of claim 11 in which each corrugation has a ridge and a shoulder, the height of the ridge being offset from the height of the shoulder such that a cross section of a corrugation in a direction transverse to the longitudinal axis is non-symmetrical.

13. The conduit of claim 12 in which the corrugations are oriented relative to each other such that the ridge of each corrugation is adjacent to the shoulder of at least one adjoining corrugation.

14. The conduit of claim 12 in which the ridge of at least one corrugation is wider than the shoulder in the longitudinal direction.

15. The conduit of claim 12 in which the corrugations slope downward from the ridge to the shoulder.

16. The conduit of claim 11 in which adjourning corrugations are laterally offset from each other relative to the longitudinal axis.

17. The conduit of claim 10 further comprising a plurality of passages for enabling liquids to leach from the conduits.

18. The conduit of claim 10 further comprising a plurality of vents in the corrugations for allowing air to escape from the conduit.

19. The conduit of claim 10 further comprising a pipe access port offset from the longitudinal axis of the conduit.

20. The conduit of claim 10 wherein the conduit includes a plurality of alternating corrugations, the cross section of each corrugation in the direction transverse to the longitudinal axis being symmetrical about the longitudinal axis.

21. The conduit of claim 20 wherein the symmetrical corrugations are arch-shaped.

22. The conduit of claim 10 wherein at least one flange member includes a latch mechanism on its matable surface.

23. The conduit of claim 22 wherein the latch mechanism is alternating rows of teeth and grooves, the grooves dimensioned to receive teeth from the like conduit.

24. A conduit having a plurality of alternating corrugations along its length, each corrugation having an arch-shaped cross section, the conduit comprising:
a flange located on at least one end of the conduit, the flange having a series of flange members alternating about a common reference curve, which defines a matable surface boundary of each flange member.

25. The conduit of claim 24 further comprising a sub-arch at the flanged end of the conduit.

26. The conduit of claim 25 wherein the flange extends around the perimeter of the sub-arch.

27. The conduit of claim 24 wherein at least one flange member includes a latch mechanism on its matable surface.

28. The conduit of claim 27 wherein the at least one flange member is selected from the group consisting of an overlapping and an overlapped flange member.

29. The conduit of claim 27 wherein the latch mechanism is alternating rows of teeth and grooves, the grooves dimensioned to receive teeth from the like conduit.

30. The conduit of claim 24 wherein the conduit is plastic.

31. A method of installing a conduit for receiving and dispersing liquids comprising the steps of:
coupling a first conduit to a second conduit with mating locking flanges located on each conduit, each locking flange comprising a series of flange members alternating about a common reference curve which defines a matable surface boundary of each flange member, the flange members of the conduits mating together and locking the conduits together.

32. The method of claim 31 wherein the step of coupling comprises latching at least one flange member of the first conduit with a mating flange member of the second conduit.

33. The method of claim 31 further comprising the step of coupling a discharge pipe to an access port.

34. The method of claim 33 wherein the access port is offset from the longitudinal axis of the conduit.

35. On a conduit, a first flange for mating the conduit with a like second flange on another object, the first flange comprising:
a series of flange members alternating about a common reference curve which defines a matable surface boundary of each flange member, the matable surface boundaries of the first flange interfacable with a complementary surface boundary of the second flange.

36. The flange of claim 35 wherein the mated flanges restrict relative movement of the conduit and the object in directions normal to the matable surface boundaries.

37. The flange of claim 35 wherein at least one flange member of the first flange is adjacent to three flange members of the second flange when the conduit and object are mated.

38. The flange of claim 35 wherein the object is a conduit.

39. The flange of claim 35 wherein the conduit and the object are like devices.

40. The flange of claim 35 wherein the flange members include a latching mechanism at the surface boundaries to facilitate locking of the first flange with the second flange.

41. The flange of claim 35 wherein at least one flange member includes a gusset.

42. A hollow load bearing structure having a base plane formed by a longitudinal axis and a transverse lateral axis, the structure comprising a longitudinal plane along the longitudinal axis and orthogonal to the base plane that bisects the structure, the structure comprising a plurality of corrugations extending in directions transverse to the longitudinal axis, there being at least one corrugation that is not bisected by the longitudinal plane.

43. The structure of claim 42 in which each corrugation has a ridge and a shoulder, the ridge being higher than the shoulder such that a cross-section of a corrugation in a direction transverse to the longitudinal axis is non-symmetrical.

44. The structure of claim 43 in which the corrugations are oriented relative to each other such that the ridge of each corrugation is adjacent to the shoulder of an adjoining corrugation.

45. The structure of claim 43 in which the ridge of at least one corrugation is wider than the shoulder in the longitudinal direction.

46. The structure of claim 44 in which the corrugations slope down from the ridge to the shoulder.

47. The structure of claim 42 in which adjoining corrugations are laterally offset from each other relative to the longitudinal axis.

48. The structure of claim 42 further comprising a locking flange at a longitudinal end of the structure for locking the structure to another structure, the locking flange including a series of flange members which alternate about a common reference curve defining a matable surface boundary of each flange member.

49. The structure of claim 42 in which the structure is a conduit having an open bottom for burial in the ground.

50. The structure of claim 42 further comprising external webs, each external webs disposed between a respective pair of corrugations.

51. The structure of claim 50 wherein the external webs intersect the longitudinal axis at acute angles.

52. The structure of claim 42 wherein the plurality of corrugations include end corrugations, each end corrugation defining an end of the structure having a symmetrical cross-section transverse to the longitudinal axis.

53. The structure of claim 42 further comprising internal webbing to strengthen the corrugations.

54. The conduit of claim 24 wherein the alternating corrugations are alternating peak corrugations and valley corrugations.

* * * * *